Dec. 25, 1956   R. J. HIPPLE   2,775,162
EYEGLASS FRAME
Filed Sept. 28, 1953
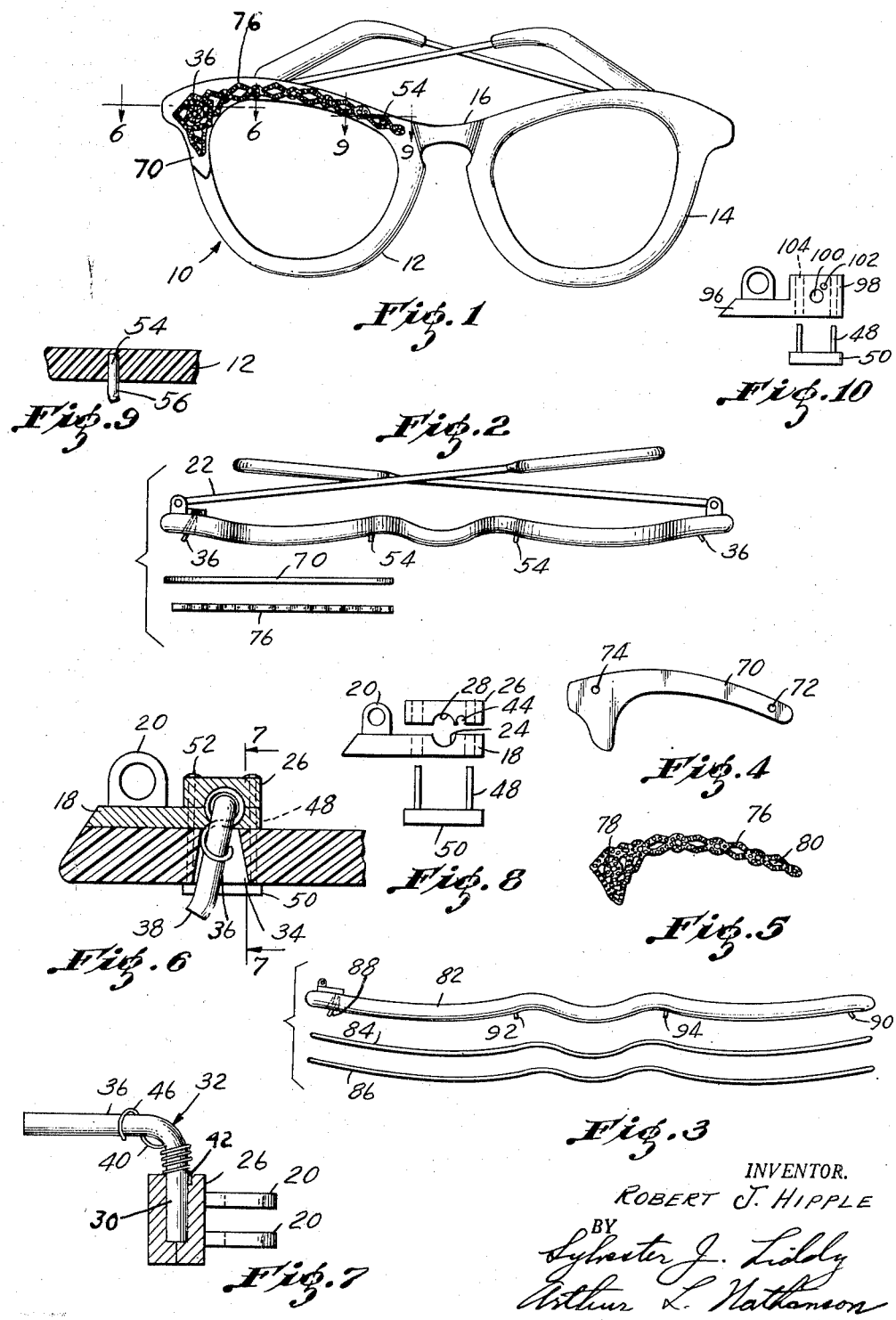
INVENTOR.
ROBERT J. HIPPLE
BY
Sylvester J. Liddy
Arthur L. Nathanson United States Patent Office 2,775,162
Patented Dec. 25, 1956

2,775,162

EYEGLASS FRAME

Robert James Hipple, Hibbing, Minn.

Application September 28, 1953, Serial No. 382,601

5 Claims. (Cl. 88—41)

This invention relates to eyeglass frames and in particular to an eyeglass frame having variable ornamental characteristics.

Women are extremely conscious of the color and design of wearing apparel, jewelry, etc. and also of the effect the wearing of glasses has on the general appearance. For these reasons glass frames now are supplied in many different patterns and have ornamental devices, such as embossed plates, metallic strips, colored plaques, etc. Frames as a result now have the characteristics of jewelry, and are considered to be appropriate accessories.

However, as is often the case, the more striking and individualistic a frame becomes, the more likely it will be completely unsuitable for certain costumes, effects, or for wear with other jewelry. Obviously, few will purchase different complete sets of glasses in order to assure compatibility with all costumes. An object of this invention, therefore, is to provide glass frames with which the color and trim, such as metal trim, can be changed to accommodate the frames to changes in costume.

A further object of my invention is to provide a simple easy to operate easy to operate means for removably fixing designs and coloring strips to glass frames.

A further object of this invention is to provide a frame with which rigid flexible decorative devices can be attached thereto without the use of screws or similar fastening devices.

Yet another object of my invention is to provide a frame with which the whole frame, or portions thereof, can be altered in appearance quickly and easily.

Still another object of my invention is to provide a frame with interchangeable accessory pieces which can be attached to the frame at two points only, and yet be securely maintained in position.

These and other objects and advantages will become apparent from the following description of the present invention illustrated in the accompanying drawing, in which:

Figure 1 is a front elevational view of a frame constructed in accordance with the invention, showing an ornamental colored plaque and a trim strip having profiled ornamental features formed thereon attached to the frame.

Figure 2 is an exploded top plan view of the frame shown in Figure 1.

Figure 3 is a view similar to Figure 2, but showing the decorative plaque and trim strips extending the full width of the frame.

Figure 4 is a front elevational view of a colored strip such as shown in Figure 1.

Figure 5 is a front elevational view of a metal trim strip having embossed ornamental features, such as shown in Figure 1.

Figure 6 is a sectional view taken along line 6—6 of Figure 1.

Figure 7 is a partial sectional view taken along line 7—7 of Figure 6.

Figure 8 shows an exploded sectional view of a hinge member and cooperating bearing cap constructed in accordance with the invention.

Figure 9 is a sectional view taken along line 9—9 of Figure 1, and,

Figure 10 is a view showing a modified form of hinge member constructed in accordance with the invention.

The same reference characters in the several figures represent the same parts.

Referring now particularly to the drawing, the eye glass frame 10 comprises the usual rim sections 12 and 14 and the connecting bridge member 16. Hinge member 18 has flanges 20 adapted to pivotally connect to temples or ear pieces 22. The hinge members are ordinarily held in position by rivets extending through the rim.

Figure 8 shows that the hinge element 18 is provided with semi-circular bearing 24, and a cap 26 is adapted to lie adjacent hinge 18. Cap 26 has a semi-circular bearing opening 28 adapted to cooperate with bearing 24 to position shaft 30 of arm 32. Arm 32 can freely pivot in the bearing thus formed when cap 26 is securely affixed to hinge 18. The frame is provided with a conically shaped opening 34. An offset portion 36 of arm 32 projects forwardly through the conical opening 34 and it is seen that arm 32 can be pivoted to move the offset portion from right to left, as viewed in Figure 6. A conically shaped opening is not essential since any opening which permits such pivotal movement will be satisfactory. The forward end 38 of portion 36 can be bent as indicated in Figure 6, if desired, to more securely affix decorative pieces to the frame as hereinafter described.

Spring 40 has one end 42 inserted into an opening 44 in bearing cap 26, and is supported on the shaft 30. The opposite end 46 of the spring receives pivotal arm 36 in the manner shown. It is obvious that the spring can be designed so as to tension arm 36 to move to the left, as viewed in Fig. 6. Hinge member 18, bearing cap 26, and frame 10 are all provided with alignable openings for receiving rivets 48 affixed to a front plate 50. When the rivets are headed as shown at 52, all the elements described are rigidly positioned with the frame.

Figure 9 illustrates a pin 54 fixedly mounted in rim 12 and projecting outwardly perpendicularly thereto in a manner similar to the outer end of arm portion 36. The outer end 56 can be bent or deformed so as to curve in a direction away from outer portion 36 of arm 32. It is seen that arm 32 can be pivoted so as to move the outer portion 36 toward or away from pin 54.

Figures 1, 2, 3 and 5 show the type of decorative elements, colored plaques, trim strips, or devices, which can be used to alter the appearance of the frames, and also illustrates the manner in which they are held in position. Decorative strip 70 can comprise a thin strip of plastic, metal or any other suitable material having, for example, a solid color such as red or black or brown. The strip is provided with openings 72 and 74 adjacent opposite ends and spaced substantially the same distance apart as pin 54 is spaced from movable arm portion 36 where the arm portion projects substantially normally to the frame. It is seen that by inserting arm 36 into opening 74 and then urging the decorative strip 70 toward the right, as viewed in Figures 1 and 2, that opening 72 can be slipped over pin 54, and that by releasing the decorative strip the arm 36 will be urged toward the left, thus placing the decorative strip 70 under tension and maintaining it in position on the pin and arm, respectively.

Figure 5 illustrates an embossed strip member or plate 76 which, it is seen, has a series of spaced openings forming part of the design thereof. Opening 78 and opening 80 are spaced the same distance apart as the openings 72 and 74, and thus pin 54 and movable portion 36 of arm 32 can be inserted in openings 80 and 78, respectively, in the same manner as described for mounting plate 70. The pin and arm project outwardly of the frame sufficiently to hold both the plaque and strip firmly in position. The bent or curved outer ends 38 and 56 of arm 36 and pin 54, respectively, contribute to securely position the plaque 70 and strip 76. Figure 1 illustrates the plate of Figure 4 and the embossed element of Figure 5, both positioned on the frame. Thus, there is provided a background of a suitable color for the embossed element 76. It is obvious that an innumerable number of combinations can be made in this manner and that strips of multicolored design, etc. may be used. Embossed or otherwise decorated strips such as 76, can be provided with two openings or holes where such are not a part of the design.

The mounting and removal of the vertically designed elements can be accomplished swiftly and easily. Mounting, as described above, involves simple engagement of the particular plate or strip or member with the pivotal arm, movement of the plate toward the right, as viewed in Figs. 1 and 2, and slipping of the opposite end of the plate over the fixed pin. To remove the plates or devices, it is only necessary to urge the pivoted arm toward the right, as viewed in Figs. 1 and 2, as by a thumb nail or by pressure against the plate, and then slip the opposite end of the plate off pin 54. The plate or device will then easily also come off arm 32. It is seen that any one can readily and quickly change the style or appearance of their glass frames by rapidly interchanging plates or strips. The frames can be purchased with a set of plates and strips and other such strips or plates can be added from time to time to make a collection by means of which the glass frames can be adapted to any type of wear or jewelry. All of these strips and plates can be cheaply and easily made by mass production methods and sold at a very reasonable price. Also, it should be noted that the constructive features of the pivoting arm and the pin are such that they will not unreasonably increase the cost of frames.

In Figure 3 there is shown a frame 82, decorative elements 84 and 86, which can be similar to the corresponding elements shown in Figures 4 and 5, respectively, a pivoted arm 88 and a fixed pin 90.

While I have not described the manner in which the plate 84 and the segment 86 are attached to frame 82, and removed therefrom, such is obvious in view of the previous explanation. It should be noted that additional pins 92 and 94 can be used if desired. However, they are not necessary to securely affix the plates and segments to the frame.

In Figure 10 I show a modified form of hinge member 96 having an enlarged boss 98 provided with a bearing 100 and a spring end receptacle 102. The hinge is also provided with rivet holes 104 and can be mounted in the same manner as the hinge 18 and bearing block 26 (Figs. 6 and 7).

It is obvious that my method of attaching colored plaques and trim to the frame proper can also be utilized for attaching such elements to the temples 22. Also it should be apparent that my invention can be used with frames formed of any material such as plastic, metal or a combination of metal and plastic.

Many frames are formed of combinations of metal and plastic members. As a result, often the frame or even the rim that holds the lense can comprise more than one member and be formed of more than one material. The word "frame" as used herein includes all such types of multi-piece frames, as well as frames formed of single elements. This is also true of the word "rim" as used herein. Either the fixed pin or the pivoting pin can be attached to a separate metal or plastic member of the frame or rim.

While I have shown and described a preferred form of my invention, it will be understood that variation in details of form may be made without departure from the invention as defined in the appended claims.

I claim:

1. In an eyeglass frame having a rim, a hinge connected to said rim for pivotally mounting an earpiece on said rim, means forming an opening in said rim, a swingable arm pivotally connected to said hinge and having a portion projecting through said opening in said rim and extending outwardly of one side of said rim, the opening in said rim being large enough for pivotal movement of said arm, a pin positioned on said rim and projecting outwardly of said one side of said rim, and resilient means connected to said arm portion and said rim biasing said arm portion away from said pin, said arm portion being movable toward said pin upon movement of said portion by overcoming the force exerted by said resilient means, and a decorative device connected to said pin and connected to said portion of said arm, said decorative device being placed in tension between said pin and said portion by said resilient means, said portion being movable toward said pin to relieve said tension and said device being disengageable from said pin and said portion when said portion is moved toward said pin.

2. In eyeglass construction, a frame member, a pin connected to said member and projecting outwardly from one side of said member, a pin-like arm projecting outwardly of said side and spaced from said pin, a decorative device removably connected to said pin and said arm, said arm being movably mounted on said member for movement laterally with respect to said pin, means urging said arm laterally in one direction with respect to said pin, said device being placed under stress and retained in connection with said pin and said arm by the last-named means, said device being disengageable from said pin and said arm upon movement of said arm in a direction opposite said one direction.

3. In eyeglass construction, in combination a frame member, a decorative device, and means for removably attaching said decorative device to said frame comprising two spaced pins projecting outwardly from one side of said frame, at least one of said pins being movable laterally of the other of said pins, resilient means urging said one of said pins laterally of said other of said pins, means on said device connecting said device to both of said pins in stress transmitting relationship laterally of said other of said pins, said device being normally placed under stress between said pins by the urging of said resilient means, said device being removable from said pins through movement of said one of said pins in a direction opposite the direction urged by said resilient means to relieve the stress placed on said device.

4. In an eyeglass frame, a decorative device mounting means comprising an arm pivotally connected to said frame having a portion extending outwardly therefrom and a pin mounted on said frame in spaced relationship with said arm and extending outwardly therefrom, said portion being movable laterally of said pin upon pivotal movement of said arm, and means connected to said frame and said arm biasing said arm for movement of said portions in a direction laterally of said pin.

5. In an eyeglass frame comprising rim sections connected by a bridge piece, an arm pivotally mounted on one of said rim sections and having a portion projecting outwardly therefrom on one side of said frame, a pin connected to the other of said rim sections and projecting outwardly thereof on the other side of said frame, said portion being movable laterally of said pin and means connected to said portion and said frame biasing said portion for movement laterally of said pin.

References Cited in the file of this patent

UNITED STATES PATENTS

| | | |
|---|---|---|
| 2,495,508 | Cleaver | Jan. 24, 1950 |
| 2,652,746 | Shanks | Sept. 22, 1953 |

FOREIGN PATENTS

| | | |
|---|---|---|
| 182,987 | Great Britain | July 20, 1922 |
| 682,352 | Great Britain | Nov. 5, 1952 |